(12) United States Patent
Huang et al.

(10) Patent No.: US 11,594,870 B2
(45) Date of Patent: Feb. 28, 2023

(54) SYSTEMS AND METHODS FOR EXTENDING FAULT TIMER TO PREVENT OVERCURRENT PROTECTION SHUTDOWN DURING POWERING ON OF INFORMATION HANDLING SYSTEM

(71) Applicant: Dell Products L.P., Round Rock, TX (US)

(72) Inventors: Wen-Hung Huang, Taipei (TW); Kunrong Wang, Austin, TX (US); Hsien Tsung Lin, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 16/387,871

(22) Filed: Apr. 18, 2019

(65) Prior Publication Data

US 2020/0335961 A1 Oct. 22, 2020

(51) Int. Cl.
*H02H 3/02* (2006.01)
*H02H 3/093* (2006.01)
*H02H 3/08* (2006.01)

(52) U.S. Cl.
CPC .............. *H02H 3/025* (2013.01); *H02H 3/08* (2013.01); *H02H 3/093* (2013.01)

(58) Field of Classification Search
CPC ............ H02H 3/00; H02H 3/02; H02H 3/021; H02H 3/023; H02H 3/025; H02H 3/027; H02H 3/033; H02H 3/08; H02H 3/087; H02H 3/093; H02H 3/0935; H02H 3/10; H02H 3/105; H02H 3/24; H02H 3/243; H02H 3/247; H02H 9/00; H02H 9/002; H02H 9/004; H02H 9/02; H02H 9/025;
(Continued)

(56) References Cited

U.S. PATENT DOCUMENTS

2008/0055808 A1* 3/2008 Burkland ............... H02H 3/087
361/94
2014/0043867 A1* 2/2014 Sugawara ......... H02M 3/33507
363/21.15
(Continued)

OTHER PUBLICATIONS

LTC4226 Datasheet (LTC4226, "Wide Operating Range Dual Hot Swap Controller", Linear Technology, 24 pgs. http://cds.linear.com/docs/en.datasheet/4226f.pdf, 2014.) (Year: 2014).*

*Primary Examiner* — Thienvu V Tran
*Assistant Examiner* — Carlos O Rivera-Perez
(74) *Attorney, Agent, or Firm* — Jackson Walker L.L.P.

(57) ABSTRACT

A hot-swap circuit for providing soft start and overcurrent protection to an electronic circuit may include a controller and a timer. The controller may be configured to sense an electrical current associated with the hot-swap circuit, based on the electrical current sensed, perform current limiting of the electrical current to minimize inrush current to the electronic circuit, and disable the electrical current from flowing to the electronic circuit in response to the electrical current exceeding an overcurrent threshold for longer than a duration of a fault timer. The timer circuit may be configured to, for a period of time after enabling of the hot-swap circuit, cause the duration of the fault timer to be a first duration, and after the period of time, cause the duration of the fault timer to be a second duration significantly shorter than the first duration.

11 Claims, 4 Drawing Sheets

(58) Field of Classification Search
CPC ........... H02H 5/00; H02H 5/041; H02M 1/32; H02M 1/36; H02M 2001/0009; H02M 1/0009; G06F 1/26–30
USPC ..... 361/18, 58, 78, 79, 83, 86, 87, 89, 93.1, 361/93.2, 93.7, 93.9, 94, 95, 96, 97, 110; 323/276–278, 901, 908; 363/50–54, 363/56.03, 56.04, 56.07, 56.1; 713/300–340
See application file for complete search history.

(56) References Cited

U.S. PATENT DOCUMENTS

2015/0016005 A1\* 1/2015 Simonson .............. H02H 9/004
 361/93.9
2019/0006839 A1\* 1/2019 Humphrey ......... G01R 27/2605

\* cited by examiner

SYSTEMS AND METHODS FOR EXTENDING FAULT TIMER TO PREVENT OVERCURRENT PROTECTION SHUTDOWN DURING POWERING ON OF INFORMATION HANDLING SYSTEM

TECHNICAL FIELD

The present disclosure relates in general to information handling systems, and more particularly to systems and methods for extending a fault timer to prevent overcurrent protection shutdown during powering on of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units (PSUs) for providing electrical energy to components of the information handling system. Typically, a power supply unit is configured to convert an alternating-current waveform received at an input to a bulk direct-current waveform, which is in turn converted at the output of the power supply unit to an output direct-current waveform used to power components of the information handling system. Thus, a power supply unit may include a rectifier and/or power factor correction stage configured to receive the input alternating current source and rectify the input alternating waveform to charge a bulk capacitor to a desired voltage. A direct-current-to-direct-current stage may convert the voltage on the bulk capacitor to a direct-current output voltage provided to components of the information handling system in order to power such components.

In some instances, information handling systems and other electrical and electronic devices may include a hot-swap circuit. A hot-swap circuit may be coupled between an output of a power train in the PSU and a subsystem powered by the power train in order to provide for soft start and overcurrent protection. Soft start may refer to a gradual turning on of a power supply unit to avoid stressing components of an information handling system or other electronic circuit by sudden current and/or voltage surges associated with the initial charging of capacitors and transformers. Overcurrent protection may refer to protection against short-circuit, excessive currents, or current beyond an acceptable current rating of electronic components.

In existing hot-swap circuits, a startup overcurrent protection threshold may be limited at a low value during a power-on transition of an information handling system and the overcurrent protection timer during the power-on transition is of the same duration as during normal operation of the information handling system. As a result, a high-spike or high-capacity start-up current during power on may undesirably trigger the overcurrent protection circuitry, leading to shut down or unsuccessful start-up of the information handling system.

SUMMARY

In accordance with the teachings of the present disclosure, the disadvantages and problems associated with overcurrent protection shutdown during powering on of an information handling system may be reduced or eliminated.

In accordance with embodiments of the present disclosure, a hot-swap circuit for providing soft start and overcurrent protection to an electronic circuit may include a controller and a timer. The controller may be configured to sense an electrical current associated with the hot-swap circuit, based on the electrical current sensed, perform current limiting of the electrical current to minimize inrush current to the electronic circuit, and disable the electrical current from flowing to the electronic circuit in response to the electrical current exceeding an overcurrent threshold for longer than a duration of a fault timer. The timer circuit may be configured to, for a period of time after enabling of the hot-swap circuit, cause the duration of the fault timer to be a first duration, and after the period of time, cause the duration of the fault timer to be a second duration significantly shorter than the first duration.

In accordance with these and other embodiments of the present disclosure, a system comprising an electronic circuit, a power supply unit for providing electrical energy to the electronic circuit, and a hot-swap circuit for providing soft start and overcurrent protection to the electronic circuit. The hot-swap circuit may include a controller and a timer. The controller may be configured to sense an electrical current associated with the hot-swap circuit, based on the electrical current sensed, perform current limiting of the electrical current to minimize inrush current to the electronic circuit, and disable the electrical current from flowing to the electronic circuit in response to the electrical current exceeding an overcurrent threshold for longer than a duration of a fault timer. The timer circuit may be configured to, for a period of time after enabling of the hot-swap circuit, cause the duration of the fault timer to be a first duration, and after the period of time, cause the duration of the fault timer to be a second duration significantly shorter than the first duration.

In accordance with these and other embodiments of the present disclosure, a method may be provided for use in a hot-swap circuit for providing soft start and overcurrent protection to an electronic circuit, wherein the hot-swap circuit comprises a controller configured to sense an electrical current associated with the hot-swap circuit, based on the electrical current sensed, perform current limiting of the electrical current to minimize inrush current to the electronic circuit, and disable the electrical current from flowing to the electronic circuit in response to the electrical current exceeding an overcurrent threshold for longer than a duration of a fault timer. The method may include for a period of time after enabling of the hot-swap circuit, causing the duration of the fault timer to be a first duration and after the period of time, causing the duration of the fault timer to be a second duration significantly shorter than the first duration.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
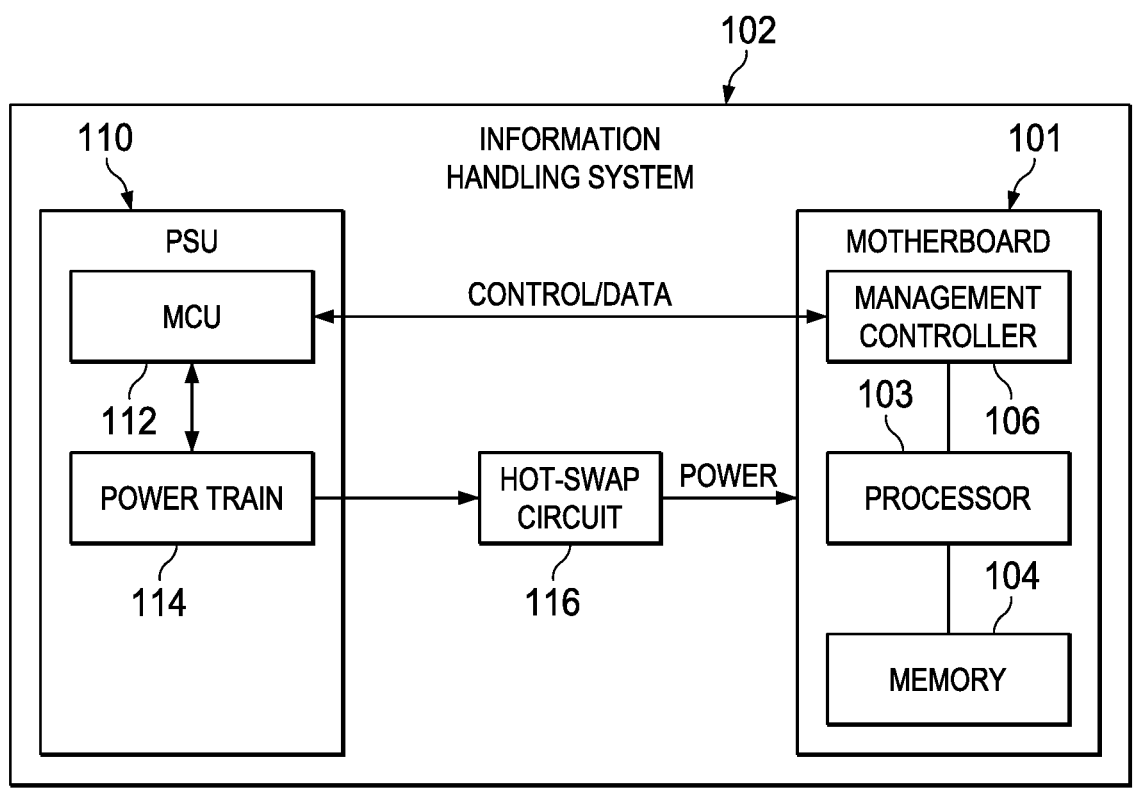
FIG. 1 illustrates a block diagram of selected components of an example information handling system, in accordance with embodiments of the present disclosure.

FIG. 1 illustrates a block diagram of selected components of an example information handling system 102, in accordance with embodiments of the present disclosure. As depicted, information handling system 102 may include a power supply unit (PSU) 110, a motherboard 101, a hot-swap circuit 116, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110 (e.g., via a Power Management Bus). For example, PSU 110 may communicate information regarding status and/or health of PSU 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102. As shown in FIG. 1, PSU 110 may include a microcontroller unit (MCU) 112 and a power train 114. Power train 114 of PSU 110 may be coupled at its outputs to a power bus configured to deliver electrical energy to motherboard 101 and other components of information handling system 102.

MCU 112 may comprise a microprocessor, DSP, ASIC, FPGA, EEPROM, or any combination thereof, or any other device, system, or apparatus for controlling operation of PSU 110. As such, MCU 112 may comprise firmware, logic, and/or data for controlling functionality of PSU 110. As shown in FIG. 1, MCU 112 may be communicatively coupled to management controller 106 allowing for communication of data and/or control signals between management controller 106 and MCU 112.

Power train 114 may include any suitable system, device, or apparatus for converting electrical energy received by PSU 110 (e.g., a 120-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator).

As shown in FIG. 1, hot-swap circuit 116 may be coupled between power train 114 and motherboard 101, and may comprise any system, device, or apparatus configured to provide for soft start and overcurrent protection for electrical energy delivered by PSU 110 to motherboard 101. Although shown in FIG. 1 as being external to PSU 110 and motherboard 101, in some embodiments, hot-swap circuit 116 may be integral to either of PSU 110 or motherboard 101. In accordance with embodiments of the present disclosure, hot-swap circuit 116 may include functionality for extending a fault timer of hot-swap circuit 116 to prevent overcurrent protection shutdown during powering on of information handling system 102, as described in greater detail below with respect to FIGS. 2 through 4.

In addition to motherboard 101, processor 103, memory 104, management controller 106, PSU 110, and hot-swap circuit 116, information handling system 102 may include one or more other information handling resources. For example, in some embodiments, information handling system 102 may include more than one PSU 110.

Figure 2:
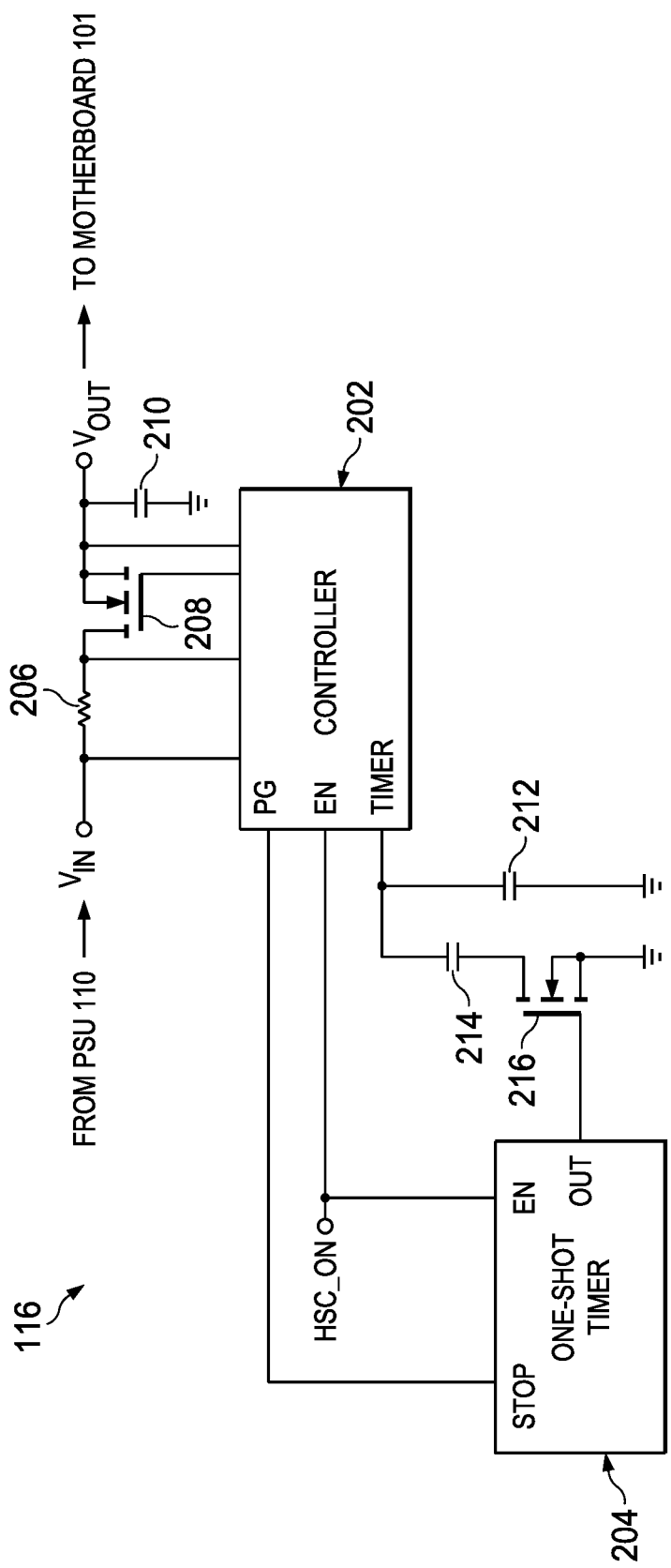
FIG. 2 illustrates a block diagram of selected components of an example hot-swap circuit, in accordance with embodiments of the present disclosure.

FIG. 2 illustrates a block diagram of selected components of example hot-swap circuit 116, in accordance with embodiments of the present disclosure. As shown in FIG. 2, hot-swap circuit 116 may include a controller 202, a one-shot timer 204, a sense resistor 206 coupled to an input of hot-swap circuit 116, a protection switch 208 in series with sense resistor 206 and having its control gate coupled to a switch control terminal of controller 204, an output capacitor 210 coupled between the output of hot-swap circuitry 116 and a ground voltage, a main timer capacitor 212 coupled between a fault timer terminal TIMER of controller 202 and the ground voltage, and a series combination of an auxiliary timer capacitor 214 and switch 216 in parallel with main timer capacitor 212, with the control gate of switch 216 coupled to an output OUT of one-shot timer 204.

Figure 3:
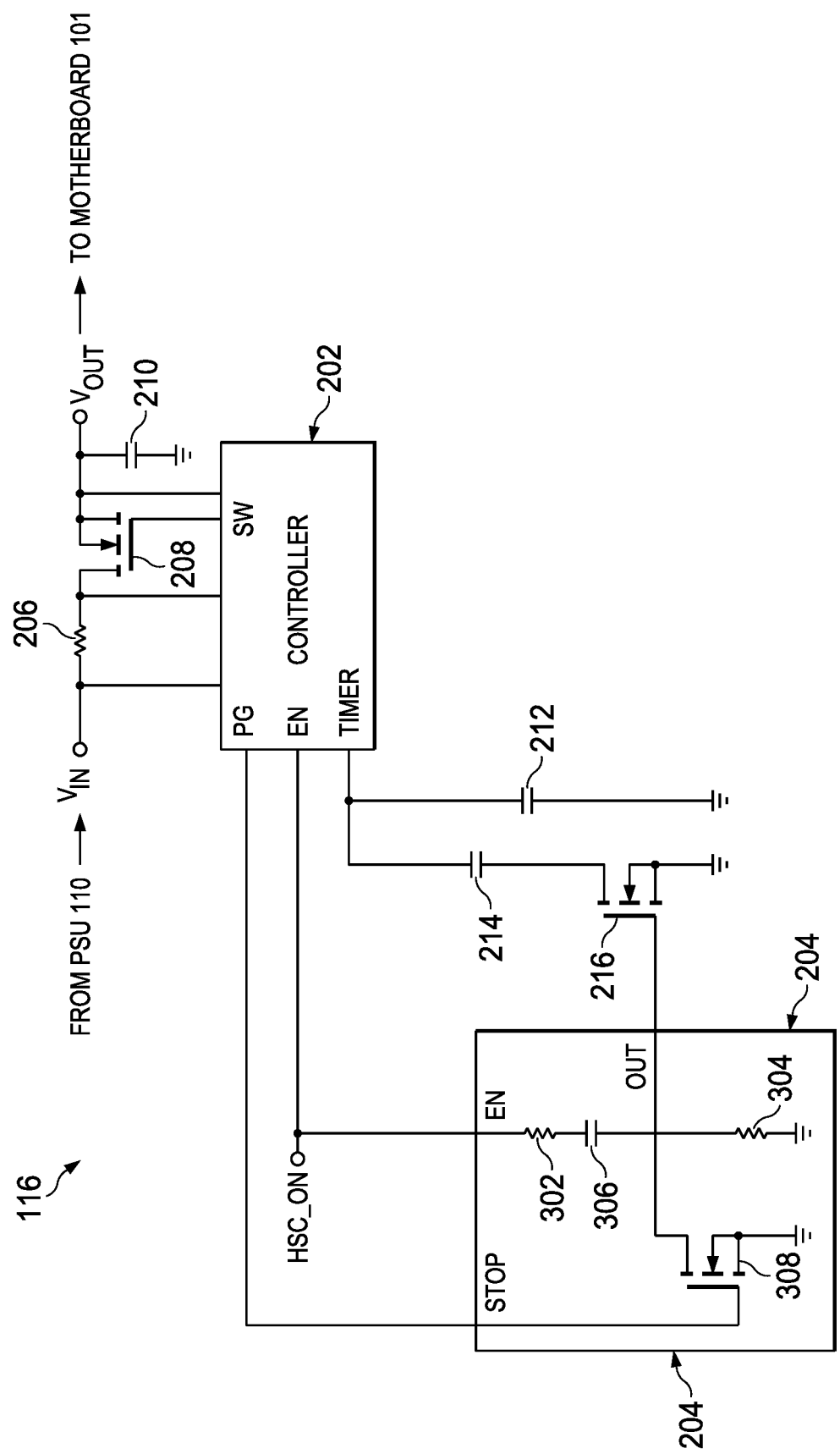
FIG. 3 illustrates a block diagram of selected components of an example hot-swap circuit with details of an example one-shot timer shown, in accordance with embodiments of the present disclosure.

FIG. 3 illustrates a block diagram of selected components of example hot-swap circuit 116 with details of an example one-shot timer 204 shown, in accordance with embodiments of the present disclosure. As shown in FIG. 3, one-shot timer 204 may include a series combination of a resistor 302 and capacitor 306 coupled between an enable terminal EN of one-shot timer 204 and an output terminal OUT of one-shot timer 204, a resistor 304 coupled between the output terminal OUT of one-shot timer 204 and the ground voltage, and a switch 308 in parallel with resistor 304 having its control gate coupled to a stop signal input terminal STOP of one-shot timer 204. Thus, in operation, when one-shot timer 204 is enabled (e.g., by signal HSC_ON increasing from the ground voltage to a significantly higher voltage), the output of one-shot timer 204 at the output terminal OUT may increase from the ground voltage to approximately the significantly higher voltage, thus enabling (e.g., turning on, activating) switch 216. After one-shot timer 204 is initially enabled, a voltage on the output terminal OUT may decay towards the ground voltage by discharging capacitor 306 through resistor 304, which may, after a time defined by a time constant of the series combination of resistor 302, resistor 304, and capacitor 306, fall to a low enough voltage sufficient for disabling (e.g., turning off, deactivating) switch 216. In addition, if a signal at stop signal input terminal STOP is asserted (e.g., increased from the ground voltage to the significantly higher voltage), such signal assertion may enable switch 308, almost immediately driving voltage on the output terminal OUT to the ground voltage and disabling switch 216.

In operation of controller 202, sense resistor 206 may sense a voltage indicative of a current through resistor 206 which is thus indicative of a current delivered to hot-swap circuit 116 from PSU 110. Based on such sensed current, controller 204 may control switch 208 (e.g., in a linear region of operation of switch 208), in order to limit current in order to prevent a large inrush current, thus achieving soft start for electrical energy delivered to motherboard 101 at the output of hot-swap circuit 116. In addition, controller 202 may be configured to provide for overcurrent protection of motherboard 101. For example, controller 202 may disable switch 208, thus leading to shutdown of motherboard 101, in the event that a current sensed by sense resistor 206 exceeds a threshold current level for a duration of time, which may be referred to as the fault timer, defined by an effective capacitance seen at the fault timer terminal TIMER of controller 202. Thus, when switch 216 is enabled, the effective capacitance seen at the fault timer terminal TIMER of controller 202 may be the sum of capacitances of capacitors 212 and 214, and when switch 216 is disabled, the effective capacitance seen at the fault timer terminal TIMER of controller 202 may be the capacitance of capacitor 212. Thus, the fault timer may be of longer duration when switch 216 is enabled rather than disabled.

Thus, at powering on of information handling system 102, which may cause the signal HSC_ON to be asserted, one-shot timer 204 may enable switch 216, such that the fault timer is defined by the sum of capacitors 212 and 214, and thus is extended, which facilitates power on of motherboard 101 with high turn-on spike current or high capacity. If, after such an extended fault threshold time expires during power-on and an overcurrent overcurrent still exists, controller 202 may cause shutdown (e.g., by disabling switch 208). Due to the assertion of controller 202 of a "power good" signal (which is issued upon a successful power-on of information handling system) at power good terminal PG which may enable switch 308, switch 216 may be deactivated, such that the effective capacitance seen by timer terminal TIMER decreases, causing a corresponding decrease in the fault timer. Thus, in accordance with the systems and methods described above, at powering on of information handling system 102, the duration of the overcurrent protection fault timer may be increased to prevent overcurrent protection shutdown, and after successful powering on, the fault timer may be decreased to execute overcurrent protection in normal fashion.

Figure 4:
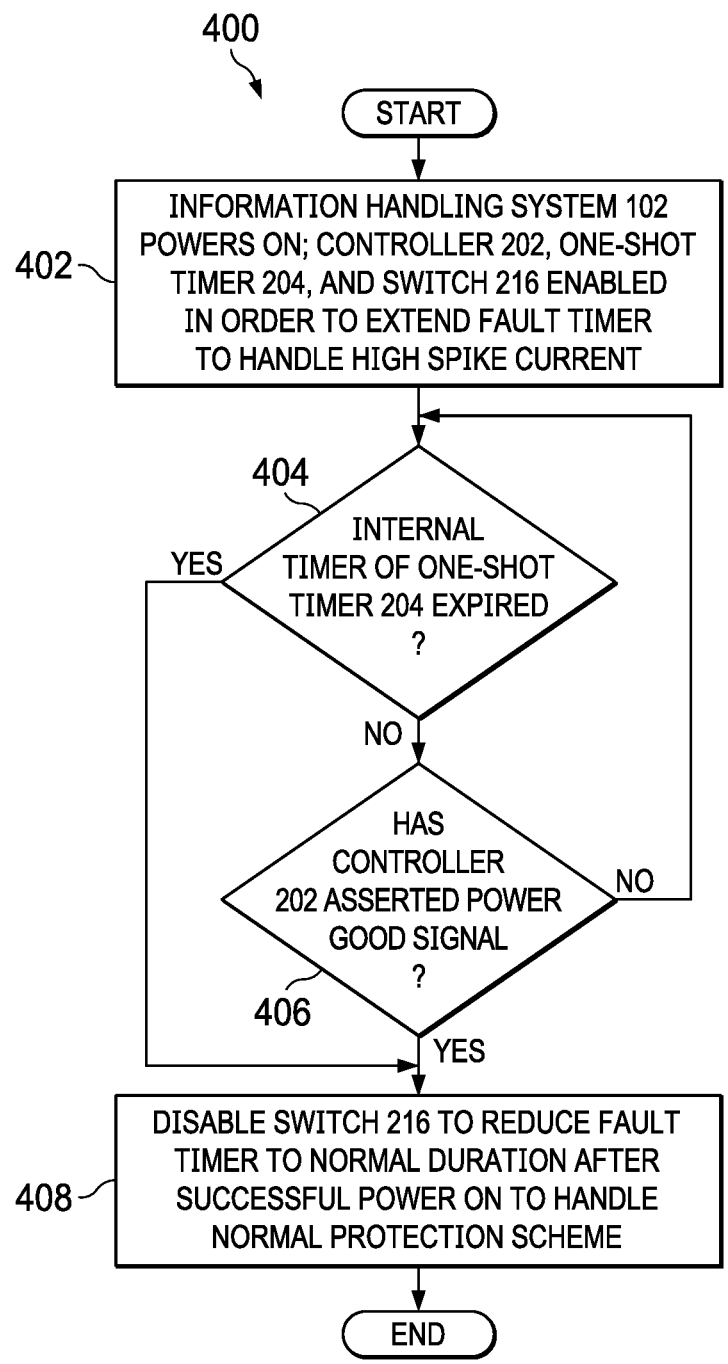
FIG. 4 illustrates a flow chart of an example method for extending a fault timer to prevent overcurrent protection shutdown during powering on of an information handling system, in accordance with embodiments of the present disclosure.

FIG. 4 illustrates a flow chart of an example method 400 for extending a fault timer to prevent overcurrent protection shutdown during powering on of information handling system 102, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, information handling system 102 may power on, and controller 202, one-shot timer 204, and switch 216 may be enabled in order to extend fault timer to handle high-spike current during powering on of information handling system 102.

At step 404, one-shot timer 204 may determine if an internal time of the one-shot timer 204 (e.g., embodied by the series combination of resistor 302, resistor 304, and capacitor 306) has expired. If the internal timer has expired, method 400 may proceed to step 408. Otherwise, if the internal timer has not expired, method 400 may proceed to step 406.

At step 406, one-shot timer 204 may determine if controller 202 has asserted its power good signal. If the power good signal has been asserted, method 400 may proceed to step 408. Otherwise, if the power good signal has not been asserted, method 400 may proceed again to step 404.

At step 408, one-shot timer 204 may disable switch 216 in order to reduce the fault timer to its normal duration after a successful powering on to handle the normal protection scheme of hot-swap circuit 116. After completion of step 408, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102, one or more individual components thereof, or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A hot-swap circuit for providing soft start and overcurrent protection to an electronic circuit, the hot-swap circuit comprising:
- a controller, enabled by assertion of a hot-swap circuit signal, configured, when enabled, to:
  - sense an electrical current provided to a transistor switch;
  - based on the electrical current sensed not exceeding an overcurrent threshold, control the transistor switch to perform current limiting of the electrical current to minimize inrush current to the electronic circuit; and
  - disable the transistor switch to prevent electrical current from flowing to the electronic circuit in response to the electrical current exceeding the overcurrent threshold for longer than a duration of a fault timer; and
- a timer circuit comprising a one shot timer, enabled by assertion of the hot-swap circuit signal, wherein the timer circuit is configured to:
  - for a period of time after assertion of the hot-swap circuit signal, cause the duration of the fault timer to be a first duration; and
  - after the period of time, cause the duration of the fault timer to be a second duration significantly shorter than the first duration;
- wherein the one-shot timer is configured to:
  - for the period of time after assertion of the hot-swap circuit signal, enable a switch in series with an auxiliary capacitor to increase a capacitive loading of a signal provided to a fault timer input of the controller; and
  - after the period of time, disable the switch to decrease the capacitive loading of the signal provide to the fault timer input of the controller.

2. The hot-swap circuit of claim 1, wherein the timer circuit is further configured to cause the duration of the fault timer to be the second duration in response to assertion of a control signal associated with the controller.

3. The hot-swap circuit of claim 1, wherein an output of the one shot timer is connected to a control gate of the switch and wherein output terminals of the switch are connected in series with the auxiliary capacitor between ground and the fault timer input.

4. The hot-swap circuit of claim 3, wherein the timer circuit includes a main capacitor connected between ground and the fault timer input.

5. The hot-swap circuit of claim 1, wherein the transistor switch comprises a field effect transistor (FET) switch and wherein the controller is configured to:
- control the FET switch to perform said current limiting by controlling the FET switch to operate in a linear region of operation.

6. A system comprising:
- an electronic circuit;
- a power supply unit for providing electrical energy to the electronic circuit; and
- a hot-swap circuit for providing soft start and overcurrent protection to the electronic circuit, the hot-swap circuit comprising:
  - a controller, enabled by assertion of a hot-swap circuit signal, configured, when enabled, to:
    - sense an electrical current provided to a transistor switch;
    - based on the electrical current sensed not exceeding an overcurrent threshold, control the transistor switch to perform current limiting of the electrical current to minimize inrush current to the electronic circuit; and
    - disable the transistor switch to prevent electrical current from flowing to the electronic circuit in response to the electrical current exceeding an overcurrent threshold for longer than a duration of a fault timer; and
  - a timer circuit comprising a one shot timer, enabled by assertion of the hot-swap circuit signal, wherein the timer circuit is configured to:
    - for a period of time after assertion of the hot-swap circuit signal, cause the duration of the fault timer to be a first duration; and
    - after the period of time, cause the duration of the fault timer to be a second duration significantly shorter than the first duration;
  - wherein the one shot timer is configured to:
    - for the period of time after assertion of the hot-swap circuit signal, enable a switch in series with an auxiliary capacitor to increase a capacitive loading of a signal provided to a fault timer input of the controller; and
    - after the period of time, disable the switch to decrease the capacitive loading of the signal provide to the fault time input of the controller.

7. The system of claim 6, wherein the timer circuit is further configured to cause the duration of the fault timer to be the second duration in response to assertion of a control signal associated with the controller.

8. The system of claim 6, wherein an output of the one shot timer is connected to a control gate of the switch and wherein output terminals of the switch are connected in series with the auxiliary capacitor between ground and the fault timer input.

9. The system of claim 8, wherein the timer circuit includes a main capacitor connected between ground and the fault timer input.

10. The system of claim 6, wherein the electronic circuit comprises an information handling system motherboard.

11. The system of claim 6, wherein the transistor switch comprises a field effect transistor (FET) switch and wherein the controller is configured to:
- control the FET switch to perform said current limiting by controlling the FET switch to operate in a linear region of operation.

* * * * *